United States Patent Office 2,991,594
Patented July 11, 1961

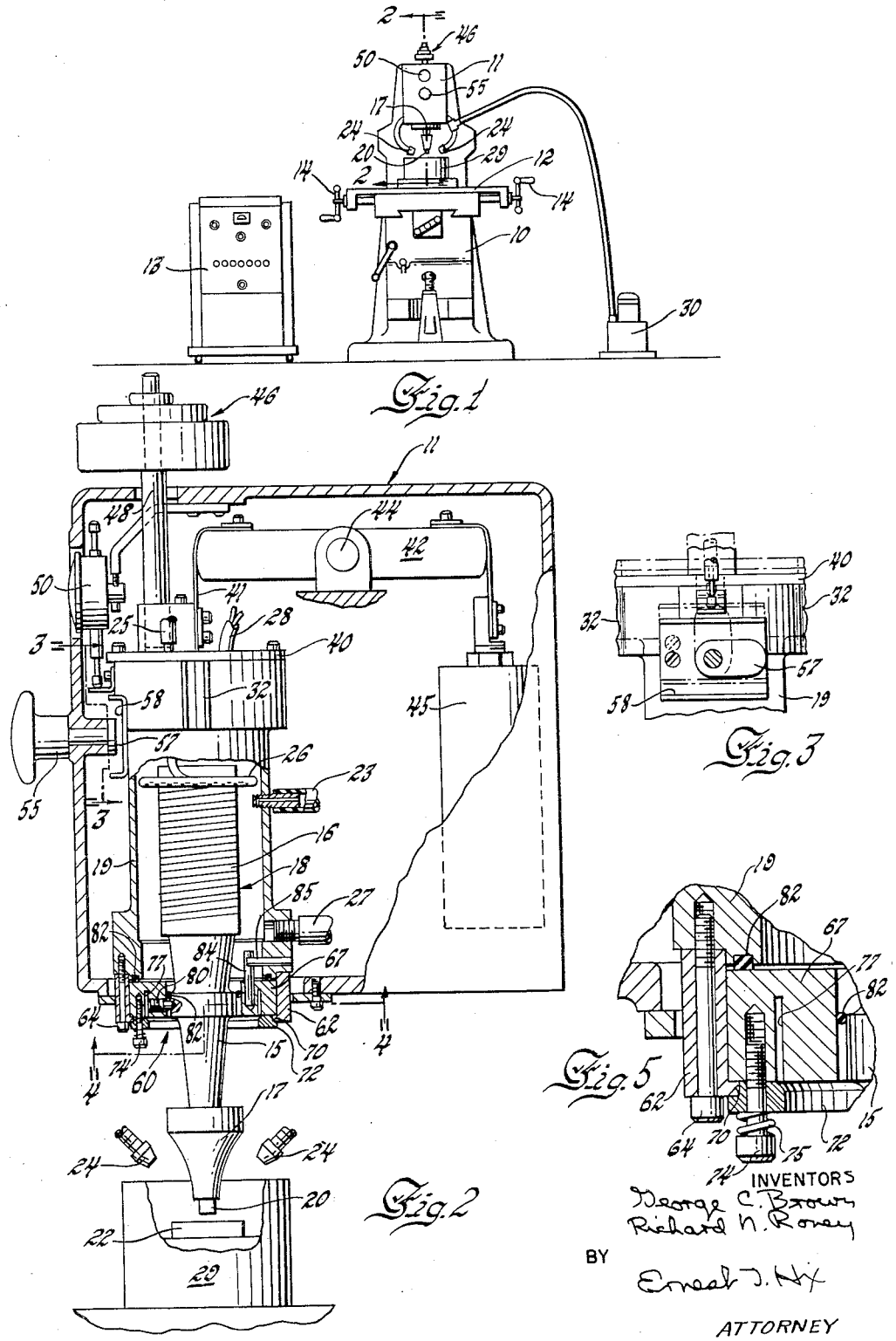

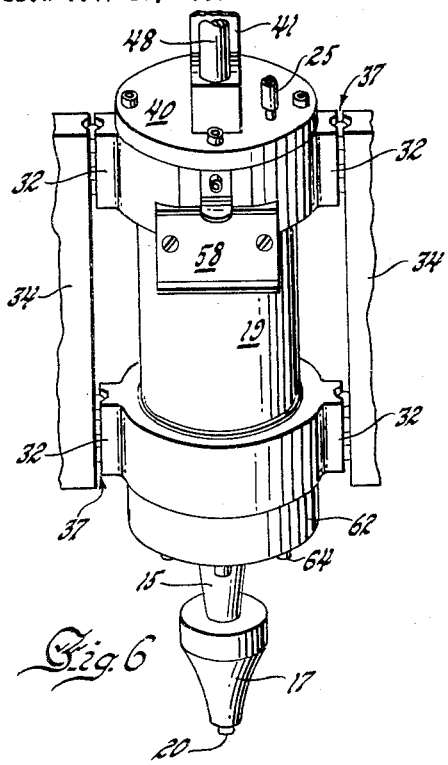
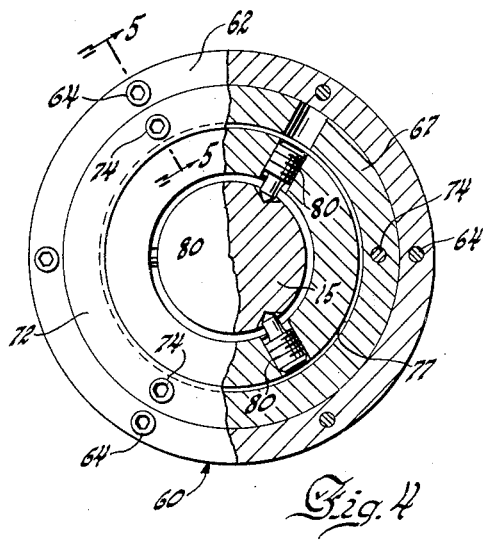
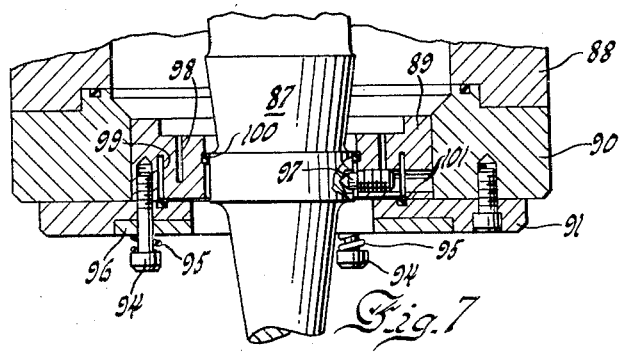

2,991,594
MACHINE DEVICE
George C. Brown and Richard N. Roney, Dayton, Ohio, assignors to The Sheffield Corporation, Dayton, Ohio, a corporation of Delaware
Filed Oct. 17, 1957, Ser. No. 690,861
11 Claims. (Cl. 51—59)

This invention relates to high frequency equipment for machining or treating materials and more particularly to suspension means for supporting and relatively isolating components thereof.

Machines are now available utilizing extremely high frequency mechanical oscillations or vibrations approaching or in the ultrasonic range for treating or forming materials. In such machines the driving unit includes a means of converting input energy into high frequency mechanical oscillations of an output member for application as desired. One present machine has a driving unit including a magnetostrictive transducer for conversion of electromagnetic to mechanical oscillations of a forming tool driven thereby. The unit is driven at resonance during operation and the tool, while oscillating at high frequency and minute amplitude, is applied to the work in an area flooded with abrasive in a liquid suspension.

Ideally, except for inherent losses within the driving unit itself, full input energy should be available at the point of application, e.g., the forming tool. However, it has been found that in such machines energy wave transmission from the high frequency driving unit, through its suspension, and to the carrying means of the machine has resulted in objectionable noise due to vibration of the supporting components, damage to the carrying means of the machine, and loss of efficiency of the driving unit due to dissipation of energy through vibration and heating of supporting components of the machine.

Where such machines are used for forming operations as by drilling, it is important that optimum efficiency be achieved and that precise tool alignment and location be maintained. Transmission of energy from the driving unit to the supporting guides and bearings in this particular type machine has resulted in destruction of or damage to these components, resulting in shorter effective useful life and loss of accuracy.

It is accordingly an object of this invention to provide a suspension for driving units in such machines for increasing the efficiency of operation and accuracy of performance thereof.

It is a further object to provide such a suspension which is effective to isolate the driving unit and prevent transfer of vibration or dynamic energy therefrom to the remainder of the machine at the operating frequencies, whereby damage to the machine is prevented and operating efficiency of the assembly is improved.

It is a further object to provide such a suspension including an annular radially expansible member connected to a carrier of the machine, and to the driving unit at a nodal point of high radial expansion and contraction and minimum longitudinal movement, the expansible member accommodating and damping radial movements to isolate the unit while accurately positioning the unit for precision machining operations or the like.

It is a further object to provide such a suspension wherein the annular member is connected to the driving unit by spaced point contacts for minimization of energy transfer and cooperates with a cylindrical sleeve to house and enclose the driving portion of the unit, the member having annular groove means providing flexing portions to accommodate and dampen radial expansions and contractions of the unit at the connection location.

It is a further object to provide a guiding and suspension structure for high frequency driving units of this nature giving rigid, accurate guiding of the unit in its operation and making possible ready adjustment of the unit rotationally relative to the work.

Other objects and advantages of the invention will be apparent from the following description, the appended claims, and the accompanying drawings, in which, FIGURE 1 is a view in elevation of an ultrasonic machine tool embodying the present invention, FIGURE 2 is a longitudinal central section of the tool head of the machine, taken on line 2—2 of FIGURE 1, FIGURE 3 is a fragmentary view on line 3—3 of FIGURE 2, FIGURE 4 is a view of the suspension means of the machine shown in partial section taken along line 4—4 of FIGURE 2, FIGURE 5 is a fragmentary section, taken on line 5—5 of FIGURE 4, FIGURE 6 is a perspective view of the forming unit, its housing and guides, and FIGURE 7 is a sectional view illustrating a second suspension modification.

The present invention provides a suspension for a high frequency driving unit of a machine tool or the like which effectively isolates the driving unit and prevents transmission of energy and vibrations therefrom while maintaining precise location and alignment. The suspension includes a support extending between the high frequency driving unit and the carrier of the machine. At its point of connection with the carrier the support in effect has extremely high or infinite impedance at operating frequencies of the driving unit. The support operates as though it had infinite mass under these conditions to prevent vibratory energy transmission from the driving unit to the carrier.

The particular suspension illustrated includes an annular support connected to the carrier of the machine at its outer periphery, and to the driving unit in a nodal plane where maximum radial contraction and expansion and minimum longitudinal movement occurs. Point contacts are provided in engagement with the unit to minimize the area for energy transfer. The support is conformed so that its radial resonant frequency is materially different from the operating frequencies of the unit and is radially yieldable outboard of the point contacts to accommodate and dampen radial movements transmitted from the ultrasonic driving unit. Also an extremely rigid guide structure is provided and ready rotational adjustments of the driving unit are made possible through the present invention.

Referring more particularly to the drawings, FIGURE 1 illustrates an exemplary ultrasonic machine tool which is particularly adapted for drilling extremely hard materials. It includes a base 10 and a tool head 11. Base 10 supports an adjustable work carrying table 12 which is movable manually for work positioning through cranks such as those indicated at 14.

Tool head 11 supports the driving unit 18 of the machine which includes a magnetostrictive driving transducer 16 (FIGURE 2) connected to generator 13 for converting electromagnetic to mechanical oscillations. The unit also includes a toolholder 17 connected to transducer 16 through connecting body 15. A suitably formed tool 20 is attached to the lower end of toolholder 17. Driving unit 18 is resonant at operating frequencies with its lower end being an antinode location of zero mechanical impedance. The vibratory displacements at this location are utilized to do forming work. A cylindrical housing 19, also forming a part of the carrier or slide assembly, encloses transducer 16.

A machine of this general nature is illustrated and described in more detail in U.S. Patent 2,791,066, issued May 7, 1957.

During machining operations and energization of transducer 16, tool 20 is vibrated vertically at ultrasonic frequencies and minute amplitudes toward and from a workpiece indicated at 22. An abrasive slurry is flooded over the forming area through nozzles 24. A cooling liquid is supplied through connection 25 and a spray ring 26 surrounding transducer 16. The liquid is exhausted from within housing 19 through a lower connection 27. Conduit 23 conducts away any overflow. Connection 28 is for electrical supply and leads to transducer 16. Retainer 29 surrounds the work and retains the abrasive slurry during forming and returns it to an abrasive supply pump indicated at 30.

The high frequency driving unit 18 is supported from housing 19 through a suspension later described. Housing 19 has guideway segments 32 (see FIGURE 6) adjacent each end thereof cooperating with extended guideways 34 fixedly mounted in head 11. Balls 37, carried with housing 19 in a conventional manner, seat between segments 32 and extended guideways 34. This provides an extremely rigid and accurate vertical guiding of the unit in its operation, supporting driving unit 18 rigidly at the lower end of housing 19 and adjacent the unit suspension. Housing 19 includes a plate 40 at its upper end connected through a flexible strap 41 to a rocking beam 42 pivoted at 44. Weight 45 counterbalances the mass of the machining assembly and smaller weights 46 mounted on a rod 48 extending up from housing 19 provides the desired downward force during machining. Dial indicator 50 indicates movement of housing 19 and tool 20 during machining.

A knob 55 at the forward face of head 11 serves to rotate a cam 57 within channel 58 on housing 19 to raise and lock the housing and unit 18 in an upward retracted position. The upward position is shown in phantom in FIGURE 3. It is obvious that the extreme upward and downward movement of housing 19 will be limited by the engagement of the projecting lower and upper portions of channel 58 with cam 57 when the cam is in the horizontal position shown in FIGURES 2 and 3.

The entire driving unit 18 including transducer 16 and toolholder 17 is subjected to longitudinal vibrations during machining and has vibrational nodes and antinodes spaced therealong. A suspension is connected to housing 19 at its lower end and to connecting body 15 of the driving assembly at a nodal point of high radial expansion and contraction and minimum longitudinal movement.

The particular suspension 60 illustrated in FIGURES 2 to 6 includes an outer ring 62 connected by screws 64 to the lower end of housing 19. An annular integral support member 67, forming the major portion of the suspension, is piloted for rotation within ring 62 and seats against an inwardly projecting flange 70 on ring 62 (see particularly FIGURE 5).

A retaining ring 72 is attached to annular member 67 by screws 74. Springs such as that indicated at 75 in FIGURE 5 cooperate between the heads of screws 74 and retaining ring 72 to grip flange 70, thus frictionally restraining annular member 67 against rotation within ring 62.

Member 67 has an annular groove 77 therein centered at the axis of connecting body 15 and the ultrasonic driving unit 18. Point contacts engaging connecting body 15 are provided by screws 80 threaded within member 67 radially inward of groove 77.

Suspension member 67 cooperates with housing 19 to enclose transducer 16 and a portion of body 15. Sealing rings 82 are in engagement between member 67, connecting body 15, and housing 19.

The frictional drag on rotation of annular member 67 within ring 62 is sufficient to restrain unit 18 against rotation within housing 19 during operation. However, rotational adjustments of unit 18 to orient tool 20 relative to the work are possible against this drag without the necessity for releasing clamps or the like. Further, this adjustment is possible without also rotating the housing 19 or other supporting components as in previous known devices of this character. Vertical pin 84 in member 67 (see FIGURE 2) and horizontal pin 85, extending inward from housing 19, limit rotation of unit 18 to 360 degrees in any one direction in this embodiment.

The point contacts provided by screws 80 are in supporting engagement with connecting body 15 of driving unit 18 at a location as close as possible to the axis of the overall unit without disturbing the basic configuration and operation of body 15 which serves to convert and extend the amplitude of vibration progressively along its length. Due to their radially inward engagement these point contacts are disposed at the point of minimum radial expansion and contraction which can be practically achieved at this axial location. Ideally the point of suspension would be at the axis of body 15. Further, the contacts of screws 80 minimize contact area to reduce energy transmission from the unit and to annular support member 67.

Basically, the functions of member 67 are not only to support unit 18 but also to block or impede radial wave energy transmission or vibration from driving unit 18 through its suspension at operating frequencies. Annular member 67 is dimensioned and conformed so that its radial resonant frequency is materially different from the operating frequency of the driving unit and at its connection to ring 62 it effectively has high or infinite impedance at this frequency.

The reduced section in member 67 provided by groove 77 serves to yieldingly accommodate radial expansions and contractions of the driving unit at the suspension location and dampen radial movements so that at the areas of engagement of member 67 with rings 62 and 72 these movements are minimized or entirely eliminated.

Flexing at the base of groove 77 converts mechanical energy transmission through vibration to heat energy to dampen and reduce oscillations transmitted from the high frequency driving unit. Further, reflection of wave transmission at the surface discontinuities provided by groove 77 provides destructive interference to null transmitted vibrational waves. Due to change in tools, tool wear, etc., the resonant frequency and axial location of the nodal point may shift slightly. The longitudinal resonant frequency of member 67 also differs materially from that of the high frequency operation to impede energy transmission from the driving unit under these conditions.

Thus, driving unit 18 is effectively isolated from housing 19 and the ways supporting the housing. Vibration of the supporting components is eliminated to reduce noise and loosening and damaging thereof. Further, due to the reduction in energy transfer and radial vibration achived through suspension member 67 and its related components heat transfer and energy loss from the driving unit is reduced to improve operating efficiency thereof.

FIGURE 7 illustrates a modified construction for supporting a connecting body 87 of a high frequency driving unit to a housing 88. A ring 90 fixed to housing 88 rotatably pilots an annular suspension member 89 supported by plate 91. Screws 94 and springs 95 draw member 89 and a retaining plate 96 against opposite sides of plate 91. Arcuate slots are provided in plate 91 for each of screws 94 to allow rotation of member 89 and the driving unit within housing 88. Pins 97 spaced about the unit engage body 87 in point contact and oppositely facing grooves 98 and 99 accommodate and progressively dampen radial expansions and contractions of body 87 at the connecting location for isolation as with the previous embodiment described. Sealing rings are located at 100 and 101.

Thus it is seen that an isolating suspension has been provided for use in high frequency machines which effectively prevents the transmission of energy from the driving unit of such a machine and reduces the loss of energy therefrom. The operating accuracy and life of the entire machine is materially increased through this invention. Rigid support and ready rotational adjustment is provided. Optimum accuracy through a long service life and increased efficiency is obtained.

While the forms of apparatus herein described constitute preferred embodiments of the invention, it is to be understood that the invention is not limited to these precise forms of apparatus and that changes may be made therein without departing from the scope of the invention, which is defined in the appended claims.

What is claimed is:

1. An assembly for use in a high frequency machine for treating or forming materials, comprising a carrier, a unit including a toolholder and a driving transducer, said unit having nodes and antinodes of longitudinal vibration during operation, a suspension extending between said carrier and said unit at a nodal location characterized by radial expansion and contraction and minimum longitudinal movement, said suspension having a first connecting portion with minimum connecting area to reduce energy transfer from said unit to said carrier and a second connecting portion including an annular ring lying substantially in the nodal plane and having at least one circular groove therein facing axially of said unit providing a reduced portion offset axially from the nodal zone of said unit to resiliently yield for accommodating and damping radial expansions and contractions of the unit to isolate the unit while maintaining the unit in precise radial and longitudinal location relative to said carrier.

2. An assembly for use in a high frequency machine for forming or treating materials comprising a carrier, a high frequency unit including a driving transducer and a toolholder driven thereby, annular suspension means connected at its outer periphery to said carrier and at its inner periphery to said unit at a nodal location therealong characterized by radial expansion and contraction and minimum longitudinal movement, said suspension means providing a progressive damping of radial energy transmission from the unit and having a high or infinite mechanical impedance at its outer periphery at operating frequencies of the unit, and including a plurality of oppositely facing annular grooves concentric with the axis of said unit and relatively spaced radially outward therefrom, said grooves providing reduced portions at the opposite faces of said member each axially displaced from said nodal plane, both the inner and outer peripheries of the suspension means lying substantially in the same nodal plane.

3. An assembly for use in a high frequency machine for treating or forming material comprising a high frequency unit having a magnetostrictive driving transducer and a toolholder, said unit having nodes and antinodes of longitudinal vibration during operation, a carrier for said unit including a substantially cylindrical housing for said magnetostrictive member, a cooling unit within said housing including a spray assembly, an integral annular suspension member fixed at its outer edge to said housing and connected in supporting relationship with said unit at a nodal location characterized by radial expansion and contraction and minimum longitudinal movement, said suspension member cooperating with said housing to enclose said magnetostrictive member and spray assembly, said annular member having at least one circular groove therein providing a reduced portion to yield and accommodate and damp radial movements of said unit, seal means between said member and unit, and point contact means between said member and said unit for minimum energy transfer therebetween, whereby said unit is precisely located and effectively isolated from said housing.

4. An assembly for use in a high frequency machine tool for treating or forming materials comprising a high frequency unit including a toolholder and a magnetostrictive driving transducer, a housing extending along and about the transducer of said unit in spaced relation relative thereto, said housing having one closed end, suspension means between the other end of said housing and said unit including seal means, fixed guide ways extending along said housing, cooperating guide means on at least the end of said housing adjacent said suspension means and in the plane thereof extending outward from the axis of said unit directly to said guide ways to rigidly support said unit in its bodily movement and bearing means between said guide ways and said guide means for movement of said housing and unit along said ways.

5. An assembly for use in a high frequency machine tool for treating or forming materials, comprising a base, a high frequency unit including a toolholder and a magnetostrictive driving transducer, a housing enclosing at least the transducer of said unit, said housing being closed at one end, suspension means extending between said unit and the other end of said housing including an annular suspension member fixed at its radially inner portion to said unit and having its radially outer portion guided for rotation relative to said housing, whereby said unit is rotatably adjustable within said housing, guide means fixedly positioned on said base extending along said housing, cooperating guide support meants at each end of said housing extending outward from the axis of said unit directly into association with said guide means for rigid support of said housing and said unit and limit means cooperating between said base and said housing maintaining said support means in supporting relation with said extended guide means at the extremes of movement of said housing.

6. An assembly for use in a high frequency machine for treating or forming materials, comprising a carrier, a high frequency unit including a toolholder and a driving transducer, said unit having nodes and antinodes of longitudinal vibration during operation, an annular suspension member having at least one circular groove facing axially of said unit in a face thereof providing concentric circular sections interconnected by a yieldable reduced portion extending therebetween at the opposite face of said member, means connecting the innermost of said sections to said unit concentric therewith at a nodal location therealong axially spaced from said yieldably reduced portion characterized by radial expansion and contraction and minimum longitudinal movement, the sections of said member lying substantially in the nodal plane, and clamp means for fixing the outermost of said sections to said carrier, whereby said unit is supported in precise relation to said carrier and radial movements of said unit at the nodal connection are effectively accommodated and damped to isolate said carrier from said unit.

7. An assembly for use in a high frequency machine tool for treating or forming materials comprising a carrier including a substantially cylindrical housing, a high frequency unit including a toolholder and a driving transducer, said transducer being carried within said housing and said unit having nodes and antinodes of longitudinal vibration during operation, an annular suspension means connected to one end of said housing and to said unit at a nodal location therealong, said suspension means cooperating with said housing to enclose said driving transducer and including an integral annular member connected between said housing and unit, said member being radially yieldable in the nodal plane to accommodate and dampen radial expansions and contractions to isolate said unit from said carrier while maintaining the unit in precise radial and longitudinal location for precision operations, said suspension further comprising spaced point contacts between said annular member and said unit forming the connection therebetween, whereby minimum connecting area is provided to minimize energy transfer from the unit to the carrier, said member having concentric radially spaced grooves therein to provide reduced flexing portions for progressive damping.

8. An assembly for use in a high frequency machine for treating or forming materials, comprising a carrier, a high frequency unit including a toolholder and a driving transducer, said unit having nodes and antinodes of longitudinal vibration during operation, an annular suspension member having a plurality of oppositely facing grooves relatively spaced radially outward from said unit each providing a yieldable reduced portion interconnecting concentric circular sections of said member, whereby progressive damping of radial energy transmission from the unit is achieved, means connecting the innermost of said sections to said unit concentric therewith at a nodal location therealong characterized by radial expansion and contraction and minimum longitudinal movement, the sections of said member lying substantially in the nodal plane, and clamp means for fixing the outermost of said sections to said carrier, whereby said unit is supported in precise relation to said carrier and radial movements of said unit at the nodal connection are effectively accommodated and damped to isolate said carrier from said unit.

9. An assembly for use in a high frequency machine for treating or forming materials, comprising a carrier, a high frequency unit including a toolholder and a driving transducer, said unit having nodes and antinodes of longitudinal vibration during operation, an annular suspension member having at least one circular groove in a face thereof providing concentric circular sections interconnected by a yieldable reduced portion therebetween, means connecting the innermost of said sections to said unit concentric therewith at a nodal location therealong characterized by radial expansion and contraction and minimum longitudinal movement, said connecting means including point contact means threaded radially in the inner section of said member and engaging said unit at equally spaced contact points for minimum connecting area to reduce energy transfer from said unit, the sections of said member lying substantially in the nodal plane, and clamp means for fixing the outermost of said sections to said carrier, whereby said unit is supported in precise relation to said carrier and radial movements of said unit at the nodal connection are effectively accommodated and damped to isolate said carrier from said unit.

10. An assembly for use in high frequency machining of materials, comprising a base, a carrier, a high frequency unit including a toolholder and a driving transducer, said unit having nodes and antinodes of longitudinal vibration relatively spaced along its axis during operation, suspension means extending radially outward of said unit in a nodal plane thereof, said suspension means having at least one circular groove in a face thereof facing axially of said unit and providing concentric sections interconnected by a yieldable reduced portion extending therebetween at the opposite face of said suspension means, said reduced portion being axially spaced from said nodal plane whereby radial expansion and contraction of said unit at the nodal location is accommodated through the flexing of said reduced portion, parallel guide ways fixedly mounted on said carrier at each side of said unit, cooperating guide means fixed to the outer section of said suspension means substantially in said nodal plane and extending outward from the axis of said unit directly to said guide ways, and limit means cooperating between said base and said unit maintaining said guide means in supported association with said guide ways throughout the range of movement of said unit relative to the base.

11. An assembly for use in a high frequency machine for treating or forming materials, comprising a carrier, a high frequency unit including a tool holder and a driving transducer, said unit having nodes and anti-nodes of longitudinal vibration during operation, an annular suspension member having at least one circular groove facing axially of said unit in a face thereof providing concentric circular sections interconnected by a yieldable reduced portion extending therebetween at the opposite face of said member, means connecting the innermost of said sections to said unit concentric therewith at a nodal location therealong axially spaced from said yieldably reduced portion characterized by radial expansion and contraction and minimum longitudinal movement, the sections of said member lying substantially in the nodal plane, and clamp means for fixing the outermost of said sections to said carrier, said clamp means including means providing guide surfaces for rotatably journaling the outermost section of said member on said carrier for rotatable adjustments of said unit and suspension member relative thereto, whereby said unit is supported in precise relation to said carrier and radial movements of said unit at the nodal connection are effectively accommodated and damped to isolate said carrier from said unit.

References Cited in the file of this patent

UNITED STATES PATENTS

| | | |
|---|---|---|
| 2,580,716 | Balamuth | Jan. 1, 1952 |
| 2,632,858 | Calosi | Mar. 24, 1953 |
| 2,651,148 | Carwile | Sept. 8, 1953 |
| 2,664,768 | Clyne | Jan. 5, 1954 |
| 2,791,066 | Mahlmeister | May 7, 1957 |